Figure 1:
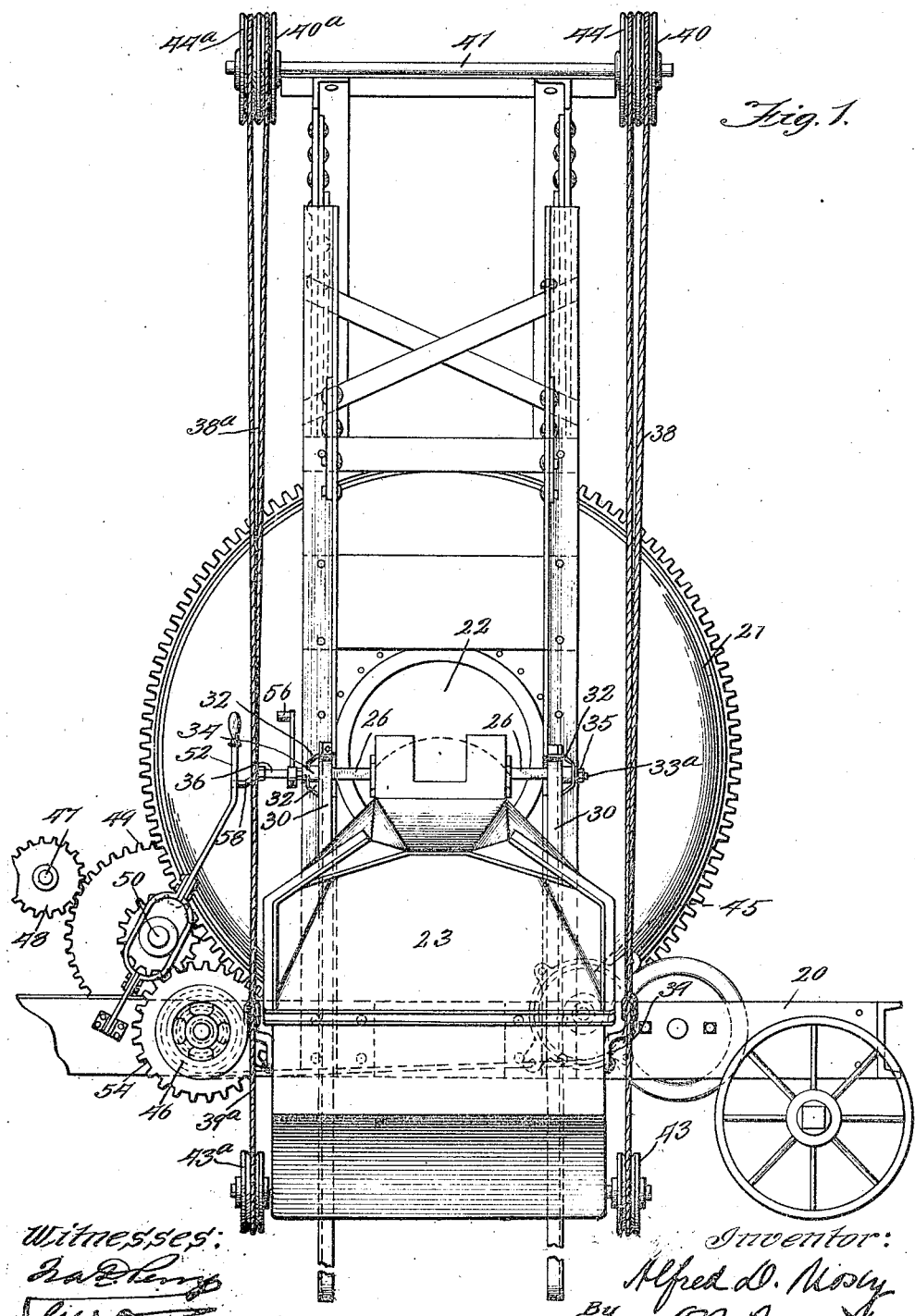

A. D. MOSBY.
LOADING APPARATUS.
APPLICATION FILED SEPT. 29, 1911.

1,156,245. Patented Oct. 12, 1915.
5 SHEETS—SHEET 1.

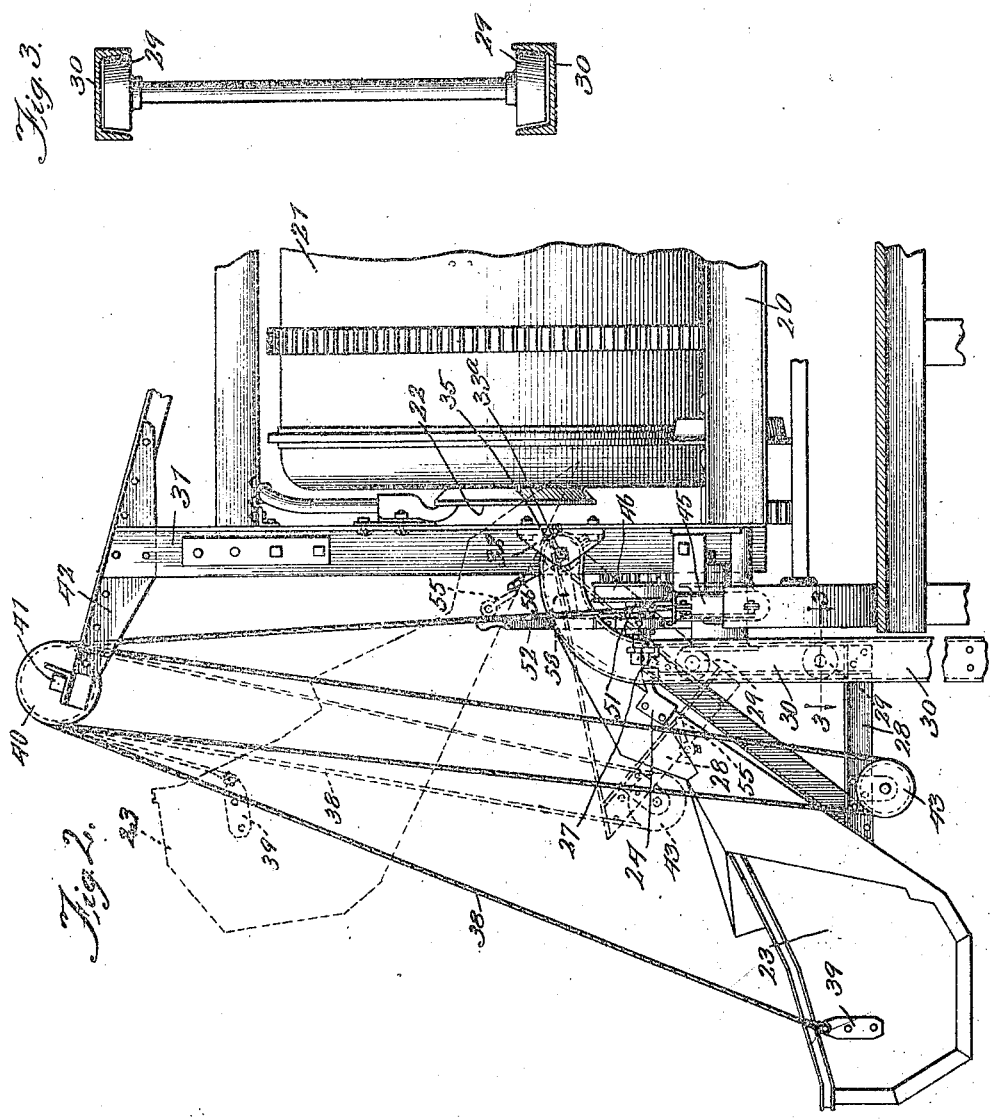

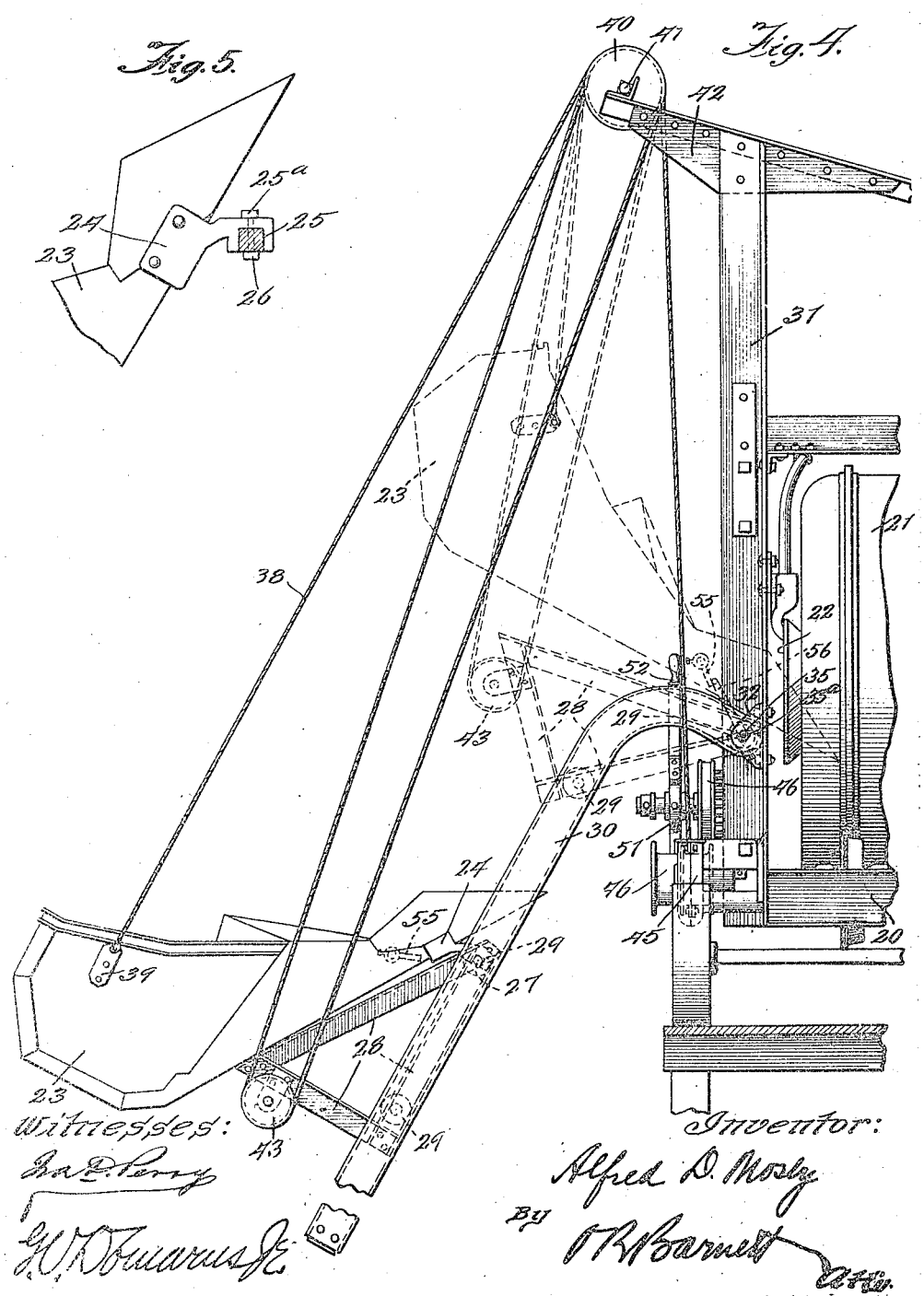

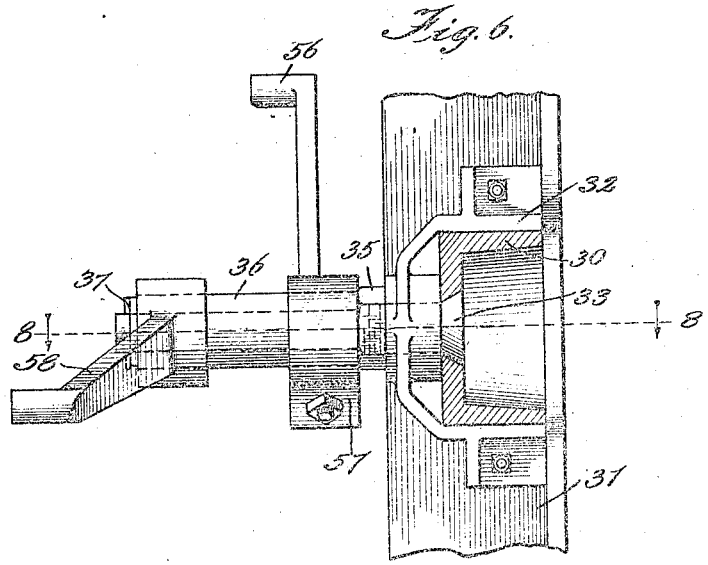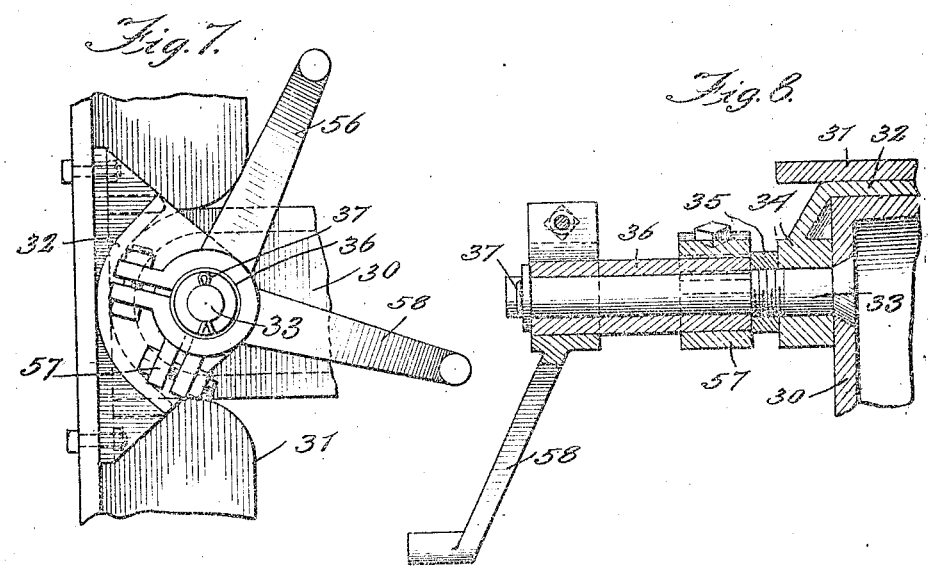

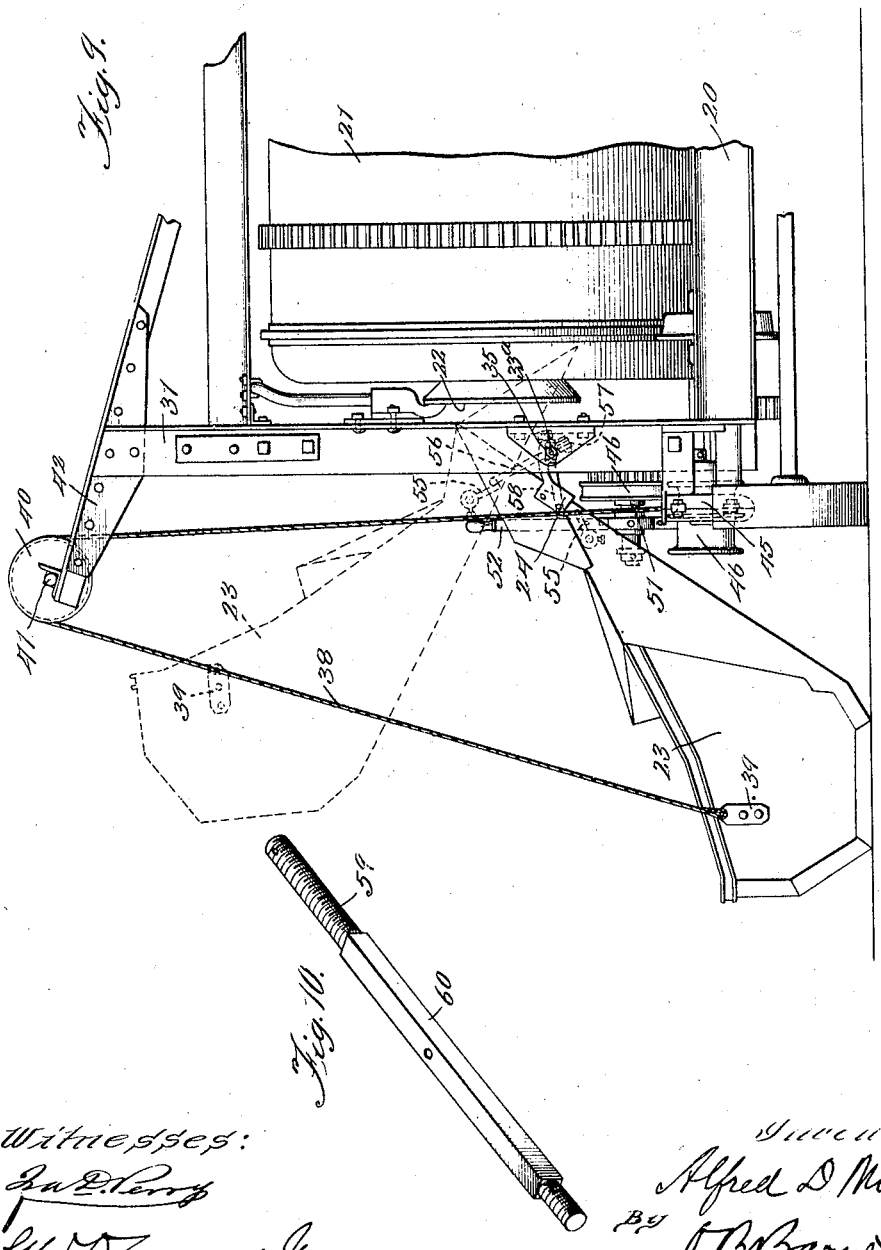

UNITED STATES PATENT OFFICE.

ALFRED D. MOSBY, OF CHICAGO, ILLINOIS, ASSIGNOR TO MARSH CAPRON MANUFACTURING COMPANY, OF CHICAGO, ILLINOIS, A CORPORATION OF ILLINOIS.

LOADING APPARATUS.

1,156,245. Specification of Letters Patent. Patented Oct. 12, 1915.

Application filed September 29, 1911. Serial No. 651,912.

*To all whom it may concern:*

Be it known that I, ALFRED D. MOSBY, a citizen of the United States, residing at Chicago, in the county of Cook and State of Illinois, have invented certain new and useful Improvements in Loading Apparatus, of which the following is a specification.

My invention relates to loading apparatus and the invention has for its object to provide an improved form of loading apparatus suitable particularly for forming a part of a concrete mixing machine in which the successive charges of material are elevated and delivered into a mixing drum; although it wll be understood that the loading apparatus in question might be used in connection with concrete mixing apparatus of a different character, or, in fact, might be employed in other operations than that of mixing concrete.

One of the principal objects of the invention, to be more specific, is to provide a loading apparatus of improved construction in which the bucket or hopper is pivotally mounted so that it can be tilted up to dump its charge into the mixing drum but which, instead of being pivoted on a fixed axis, is movable as a whole to and from its discharging position so as to allow the bucket to receive its charge at a point quite remote from the drum, making it possible for the mixing machine to be carried on a flat car or to work in other situations at some little distance from the supply of materials.

A further object is to provide a track on which the bucket moves from the place it is charged to its dumping position, the angular position of which can be varied at will; this arrangement accommodating the machine for operation on an embankment or in other elevated situations having sloping faces or approaches.

The invention has for a further object to provide in a loading apparatus of the character described means for mounting the bucket which by a simple and easily effected change of parts will allow the bucket to be either secured to a shaft in fixed position on the mixing machine, in which case it will have simply a tilting movement, or to be run up and down a track as above indicated.

A further object of the invention is to provide means automatically operated when the bucket reaches its elevated position for throwing off the power used to elevate it.

The invention is illustrated, in a preferred embodiment, in the accompanying drawings, wherein—

Figure 1 is a front elevation of the loading apparatus shown as forming a part of a revoluble drum concrete mixer, Fig. 2, a side elevation of the same; Fig. 3, a section taken on line 3—3 of Fig. 2, looking in the direction of the arrows, Fig. 4, a view similar to Fig. 2 on a somewhat enlarged scale showing the track on which the bucket runs in an oblique position; Fig. 5, a detail in elevation of the nose of the bucket; Fig. 6, a detail elevation, with parts in section, showing the attachment of the track to the frame and the devices for automatically disconnecting the hoisting apparatus from its driving means; Fig. 7, an end elevation of the parts shown in Fig. 6; Fig. 8, a section taken on line 8—8 of Fig. 6; Fig. 9, a side view of the apparatus with the track removed and the bucket pivoted to the frame of the machine, and Fig. 10, a view, in perspective, of the shaft in which the bucket, shown in Fig. 9, is pivotally mounted.

Like characters of reference indicate like parts in the several figures of the drawings.

Referring first to Figs. 1 to 4 inclusive, 6, 8 and 9, 20 designates a truck on which the concrete mixing apparatus is carried, and 21 a revoluble drum formed with a charging opening 22. The present invention concerns only the apparatus by means of which the materials going to make up the concrete are elevated and dumped in successive charges into the mixing drum. Therefore the general construction of the mixing machine need not be described.

The charging hopper or bucket 23 is provided at its upper end with a casting 24 formed with a groove 25, square in cross section, which fits over the square portion 26 (Fig. 5) of a pivoted shaft 27 carried on the upper end of a triangular carriage 28, the casting 24 being secured to shaft 27 by the bolts 25ª. The carriage 28 has the rollers 29 (Fig. 3) which run in channel iron track members 30 curved at their upper ends and pivoted to uprights 31 on the truck 20.

In order that the track members 30 should be detachable, for reasons which will appear subsequently, a pair of castings 32 are bolted to the uprights 31 into which fit the rounded ends of the track members. The tracks are secured to the castings by the pivot studs 33, 33ª which extend through the bosses 34 and are held in place by nuts 35. The stud 33 projects beyond the nuts and carries a rotatable sleeve 36 kept on by a cotter pin 37.

A hoisting mechanism is provided which first draws the carriage 28 to the upper end of the track and then tilts the bucket on its pivot 27. This hoisting mechanism is preferably made up of the following parts: 38 designates a cable attached to the bracket 39 on the bucket 23. The cable passes over a sheave 40 mounted on a shaft 41 carried by a framework 42 secured to the uprights 31. After passing over the sheave 40 cable 38 passes down over a sheave 43 on the carriage 28, then over a sheave 44 on the shaft 41, then to a sheave 45 on the truck 20 and afterward to a winding drum 46 to which the cable is attached. On the other side of the bucket a cable 38ª is attached to a bracket 39ª, passes over a sheave 40ª on shaft 41, a sheave 43ª on the carriage 20, a sheave 44ª on shaft 41, and then directly to the winding drum 46 to which the end of the cable is attached.

The winding drum is driven by any suitable mechanism. In the drawings 47 designates a constantly driven shaft (the engine for driving the same not being shown) which carries a gear 48 meshing with a gear 49 turning on the shaft 50 and adapted to be clutched thereto by a clutch 51 of ordinary construction having an operating lever 52. Shaft 50 has rigid thereon a gear 53 which meshes with a gear 54 on the winding drum 46. The bucket 23 carries a projecting finger 55 which is adapted, when the bucket reaches its discharging position, to come into contact with an arm 56 having a split hub 57 by means of which it may be adjustably secured to the sleeve 36. At the other end of the sleeve is a similar arm 58 which bears against the operating lever 52 of the clutch so that the movement of the arm 56 by the bucket moves the clutch lever throwing out the clutch, disconnecting gear 49 and shaft 50. Preferably a device is provided for holding the bucket in its elevated position after the power used to elevate the bucket has been shut off. Such a device is disclosed and claimed in my copending application Serial No. 651,913 filed September 29, 1911. As this device forms no part of my present invention it is not shown or described herein.

If desired the bucket 23 instead of being attached to the carriage 28 so as to travel up and down on the track 30 may be attached to a pivoted shaft having a fixed position near the charging opening of the drum, the track 30 and carriage 28 in this case being removed from the machine. This arrangement of the bucket is shown in Fig. 9. The bucket is removed from the shaft 27 by removing bolts 25ª. The track members 30 can be detached from the uprights 31 by removing the cotter pins 37, nuts 35 and the pivot pins 33, 33ª. By taking off one of the castings 32 a shaft 59, the middle portion of which 60 is square in cross section (Fig. 10), may be put in place in the bearings provided by the castings 32. The bucket may then be bolted to the shaft 59 in the same manner as it was bolted to the shaft 27 on the carriage 28, and the sleeve 36 with its arms 56 and 58 transferred to the projecting end of the shaft. The hoisting cables 38, 38ª are shortened by winding them up on the drum as they extend each over a single sheave at the top of the machine and then one directly to the winding drum and the other over the sheave 45 to the winding drum. In other respects the arrangement of the apparatus is the same as that heretofore described.

The operation of the apparatus, when the track and carriage are used, is as follows: Track 30 may be either in vertical position, as shown in Fig. 2, or may extend obliquely over the mixing machine, at any desired angle, as indicated in Fig. 4. The track may have any desired length. The bucket 23 is loaded and lever 52 moved to clutch the gear 49 to the shaft 50 and so revolve the winding drum in a direction to wind thereon the hoisting cables 38, 38ª. The winding of the cables on drum 46 at first elevates the carriage 28 without changing the angular position of the bucket with respect to the carriage, the bucket being held in place on the carriage by the weight of its charge. When the carriage reaches the upper end of the track 30 (see the dotted line positions of Figs. 2 and 4), the continued winding of the hoisting cables on the drum 46 tilts the bucket on its pivot sufficiently to discharge its contents into the charging opening 22 of the mixing drum. At the point of highest elevation of the bucket the finger 55 comes in contact with the arm 56 and brings arm 58 to bear against the clutch lever 52, and disconnects the winding drum from the driving apparatus.

When the track and carriage have been removed and the bucket attached to the shaft 59 having a fixed position on the machine (as shown in Fig. 9) the operation of hoisting is performed in the same way except that the bucket is simply tilted on its fixed axis.

While I have described a certain preferred embodiment of my invention it will be readily understood that modifications might be made as to certain of the forms, constructions, and devices employed without departure from my invention. Therefore I do not limit myself to the particulars shown and described except as the same are specifically made limitations on certain of the claims herein.

I do not claim herein broadly a mechanism interposed between a tilting bucket and the operating lever of the clutch for controlling the hoisting apparatus of said bucket as this invention, broadly speaking, is claimed in my aforementioned copending application Serial No. 651,913. The particular devices shown and described herein for shutting off the power from the winding drum when the bucket reaches its point of highest elevation are claimed herein only in combination with the form of apparatus herein shown. Nor do I claim herein the charging apparatus shown in Fig. 5 of the drawings hereof, this form of apparatus being disclosed and claimed in my said application Serial No. 651,913 and being shown herein merely to illustrate one of the desirable features of the form of apparatus shown in the other figures, namely, the construction and arrangement of the track, the carriage and bucket which permits the bucket to be readily removed from the carriage, the track and carriage detached from the mixing machine and the bucket pivoted to the mixing machine on a fixed axis without the necessity of making any change in the hoisting mechanism other than detaching the hoisting cables from the sheaves on the carriage and from one pair of sheaves on the framework of the machine and winding said cables on the winding drum. When the apparatus is operating upon level ground it is more convenient and desirable to eliminate the track and operate the bucket on a fixed axis. This is impossible when the machine is working in an elevated position, say upon a flat car or a wall or embankment. It is one of the very desirable features of my apparatus that the apparatus can be readily adapted for either kind of work.

I claim:

1. In apparatus of the character described, the combination with a track, of a car which runs on the track, a bucket pivoted to the car, and hoisting mechanism which draws the car up the track to its stationary position and thereafter tilts said bucket on its pivot, said hoisting mechanism engaging the car to maintain it stationary while the bucket tilts.

2. In apparatus of the character described, the combination with a track, of a car which runs on the track, a bucket movably connected with the car, and hoisting mechanism which draws the car up the track to its stationary position and thereafter moves said bucket away from the car into discharging position, said hoisting mechanism engaging the car to maintain it stationary during the discharge of the bucket.

3. In apparatus of the character described, the combination with a track, of a car which runs on the track, a bucket movably connected with the car, and a hoisting cable which engages the car and bucket so as to first elevate the car to its stationary position and then tilt the bucket with respect to the car.

4. In apparatus of the character described, the combination with a track, of a car which runs on the track, a bucket pivoted at its forward end to the car, and a hoisting cable which engages the car and bucket so as to first elevate the car to its stationary position at the upper end of the track and then tilt the bucket with respect to the car.

5. In apparatus of the character described, the combination with a supporting framework, of a track, a carriage which runs on the track, a bucket pivoted to the carriage, a hoisting cable which engages the carriage and bucket so as to first elevate the carriage and then tilt the bucket with respect to the carriage, a drum on which the cable is wound, a driving mechanism for the drum, a clutch mechanism comprising an operating lever, an angular rocking member pivoted on the frame, one arm of which is adapted to engage said clutch lever, and a finger on the bucket adapted to engage the other arm of the rocking member substantially as described.

6. In an apparatus of the character described, the combination with a supporting framework, of a bucket, means for tilting said bucket comprising a hoisting cable, a drum on which the cable is wound, a driving mechanism for the drum, a clutch for the drum provided with an operating lever, an angular rocking member pivoted to the framework, one arm of which is adapted to engage the clutch lever, and a finger on said bucket adapted to engage the other arm of the rocking member, substantially as described.

7. In apparatus of the character described, the combination with a supporting frame, of a track, a car on the track, a bucket pivoted to the forward end of the car, and hoisting mechanism comprising a pair of sheaves on the frame above the track, a sheave on the car and a cable which is engaged with the bucket, runs over one of the sheaves on the frame, then around the sheave on the car and then over the other sheave on the frame and adapted to elevate the car to its stationary position at the upper end of the track and thereafter tilt the bucket with respect to the car.

8. In apparatus of the character described, the combination with a supporting frame, of a track pivoted to the frame, a car on the track, a bucket pivoted to the car, and hoisting mechanism comprising a pair of sheaves on the frame above the track, a sheave on the car, and a cable which is engaged with the bucket, runs over one of the sheaves on the frame, then around the sheave on the car and then over the other sheave on the frame and adapted to elevate the car to its stationary position at the upper end of the track and thereafter tilt the bucket with respect to the car.

9. In apparatus of the character described, the combination with a track, of a car which runs on the track and has a bucket supporting surface inclined with respect to the track, a bucket pivoted to the car, and a hoisting mechanism which draws the car up the track to its stationary position, supports it therein, and tilts said bucket on its pivot while supporting both the car and the bucket.

10. In apparatus of the character described, the combination with a track, of a car which runs on the track and has a bucket bearing surface inclined with respect to the track, a bucket movably connected with the car, and hoisting mechanism which draws the car up the track to its stationary position, supports it therein, and moves said bucket away from the car into discharging position while supporting both the car and the bucket.

11. In apparatus of the character described, the combination with a track, of a car which runs on the track and is provided with a bucket supporting surface inclined with respect to the track, a bucket movably connected with the car, and a hoisting cable which engages the car and bucket so as to first elevate the car to its stationary position and then tilt the bucket with respect to the car.

12. In apparatus of the character described, the combination with a track, of a car which runs on the track and is provided with a bucket supporting surface inclined with respect to the track, a bucket pivoted at its forward end to the car, and a hoisting cable which engages the car and bucket so as to first elevate the car to its stationary position at the upper end of the track and then tilt the bucket with respect to the car.

13. In apparatus of the character described, the combination with a supporting frame, of a single track pivoted to the frame, a car which runs on the track and is provided with a bucket supporting surface inclined with respect to the track, a bucket pivoted to the car and normally at rest upon said surface, and a hoisting cable which engages the car and bucket so as to first elevate the car to its stationary position at the upper end of the track and thereafter tilt the bucket into discharging position.

ALFRED D. MOSBY.

Witnesses:
P. H. TRUMAN,
L. A. FALKENBERG.